June 2, 1942.  S. PALKIN  2,285,048
FILTER APPARATUS
Filed Dec. 2, 1940

INVENTOR
S. Palkin
BY
ATTORNEYS

Patented June 2, 1942

2,285,048

UNITED STATES PATENT OFFICE 2,285,048

FILTER APPARATUS

Samuel Palkin, Washington, D. C., assignor to Claude R. Wickard, as Secretary of Agriculture of the United States of America, and his successors in office Application December 2, 1940, Serial No. 368,216

1 Claim. (Cl. 210—153)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to devices suitable for filtering, and especially those which are useful in filtering viscous materials, such as oleoresin. More particularly, this invention embraces certain improvements in my prior invention, disclosed in United States Patent No. 2,198,175.

One of the objects of this invention is the provision of means which will facilitate the removal of the residue material from the filter surface.

Another object of this invention is the provision of means which not only permit the easy removal of the filter cake or residue, but also permit the easy removal of the filter units without disturbing other parts of the filter system.

Figure 2:
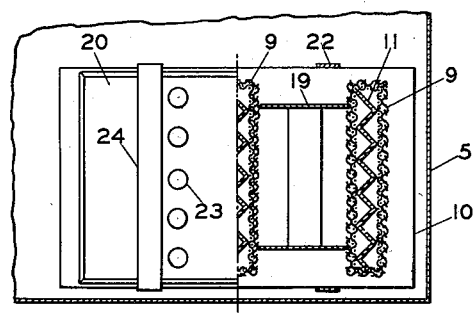
Figure 1:
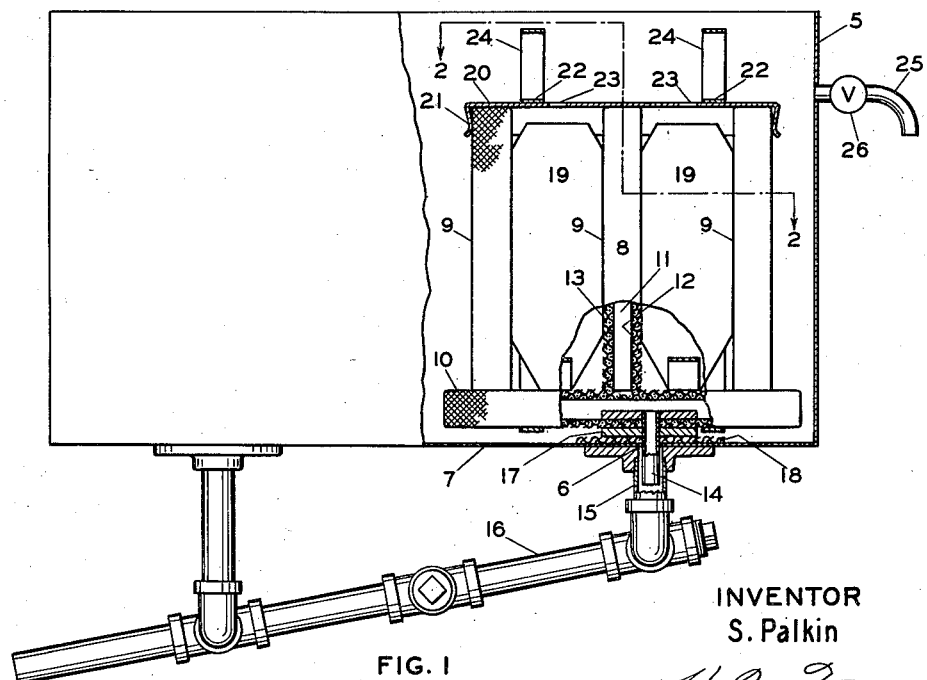

Further objects and advantages of the present invention will be apparent from the following description taken in connection with the accompanying drawing, in which drawing:

Figure 1 is a side elevational view, partly in section, of a filter system illustrating my invention; and Figure 2 is a section along the line 2—2 of Figure 1.

Referring with more particularity to the drawing in which like numerals designate like parts, the filter system comprises a reservoir or tank 5, provided with apertures 6 through the bottom 7 thereof, one aperture for each filter unit. The filter unit is designated generally at 8 and consists essentially of a plurality of vertical leaves 9 and a horizontal leaf 10. Each of these leaves comprises a corrugated plate core 11, a screen 12 encasing the core, and a filter cloth 13 encasing the screen. The space in the cores of the vertical leaves 9 drain into the core of the horizontal leaf 10, which is provided with a downwardly extending outlet pipe 14. Each aperture 6 is hermetically connected to a pipe 15 feeding into a manifold drain pipe 16, and the outlet pipe 14 is simply disposed through the aperture 6 and projects into the pipe 15, the pipe 14 being of a smaller outside diameter than the inside diameter of the pipe 15. Between the bottom 7 of the tank and the filter unit 8, there is disposed about the outlet pipe 14 a plate 17, sufficiently thick to elevate, and sufficiently wide to support, the filter unit on said bottom. Between the plate 17 and the bottom of the tank a cloth washer 18 is disposed, the function of which is to filter any material passing into the pipe 15 from the space between the said plate and the bottom. The weight of the filter unit upon the plate 17 provides a uniform pressure contact between the bottom of the filter unit and the top of said plate, and also between the bottom of the plate 17 and the washer 18, and the washer 18 and the bottom 7 of the tank. Consequently, not only must liquid entering the drain 15 from the space between the bottom 7 and the plate 17 filter through the washer 17, but also any liquid entering the drain 15 from the space between the plate 17 and the filter unit must pass through the filter cloth on the bottom of the filter unit so that those portions of the liquid which escape the filter unit in this way will be equally as well filtered as those portions entering normally through the leaves 9 and 10.

Between adjacent vertical leaves 9, there are disposed spacers 19 which hold these leaves in position and in alignment. These spacers also facilitate removal of the residue or "filter cake", since the spacers become embedded in the cake and reenforce it so that the entire cake can be removed in one piece. The vertical filter leaves 9 and the spacers 19 are held together as a unit by means of a plate 20 disposed on top of said leaves, said plate having downwardly extending flanges 21 at its ends contacting the outer sides of the outer vertical leaves 9, substantially as shown. The plate 20 is held in position by means of straps 22 disposed about said plate and the horizontal filter leaf 10. The plate member 20 may be provided with apertures 23 between the vertical leaves 9 so as to permit a better flow of the material from the top of the tank to the space between the leaves 9. The straps 22 are provided with handles 24 to facilitate removing the entire filter unit from the tank 5.

The plate 20, in addition to its function above described, also acts as a separator between unfiltered liquid and the residue or filter cake about the filter areas. In operation, as the filter unit functions, the filter cake builds up about the filter leaves until the entire space between the vertical filter leaves 9 is filled, the liquid being held at a level above the filter leaves 9. When this residue or cake builds up to the top of the leaves 9, additional filtering is too slow for practical purposes and the filter unit must be removed and the filter cake recovered. An outlet pipe 25, having a valve 26, tapped into the side of the tank at about the level of the plate 20 is used to drain off the unfiltered liquid, leaving only the residue on the filter units. The filter units are then removed by simply lifting them out, after which the straps 22 and the plate 19 are removed. The filter units are then cleaned of the residue or cake and the entire unit reinserted in the tank ready for continued use. The decanted, unfiltered liquid is then replaced in the tank and additional liquid to be filtered is added to a point above the plate 20.

Having thus described my invention, I claim:

A filter apparatus comprising a tank for receiving material to be filtered, filter units in said tank, each unit having a plurality of filter leaves vertically disposed in horizontal spaced relation, each leaf comprising a plate core and a screen encasing said core, spacers removably disposed between the adjacent filter leaves to hold them in vertical alignment, a horizontal plate secured adjacent to the top of said leaves, an outlet pipe for said filter unit extending vertically from the bottom thereof, said tank having an aperture through its bottom, the lower end of said outlet pipe being removably disposed in said aperture, a discharge pipe below said tank, said aperture being connected to said discharge pipe, a plate about said outlet pipe for supporting said filter unit on the bottom of the tank, and means between said supporting plate and said tank for filtering material passing therebetween.

SAMUEL PALKIN.